(12) United States Patent  (10) Patent No.: US 8,739,664 B2
Sinisgalli et al.  (45) Date of Patent: Jun. 3, 2014

(54) REVOLVER DISK AND TOOL HOLDER FOR A CUTTING TOOL

(75) Inventors: Riccardo Sinisgalli, Ferrara (IT); Moreno Clò, Sasso Marconi (IT)

(73) Assignee: Su-Matic Corp., Brugg (CH)

( * ) Notice: Subject to any disclaimer, the term of this patent is extended or adjusted under 35 U.S.C. 154(b) by 0 days.

(21) Appl. No.: 13/484,759

(22) Filed: May 31, 2012

(65) Prior Publication Data

US 2012/0309601 A1 Dec. 6, 2012

(30) Foreign Application Priority Data

May 31, 2011 (CH) ........................................ 0928/11

(51) Int. Cl.
*B23B 29/00* (2006.01)
*B23B 29/02* (2006.01)

(52) U.S. Cl.
USPC ............................................. 82/159; 82/160

(58) Field of Classification Search
USPC ............. 82/159, 160, 161, 121, 120; 29/35.5, 29/39, 40
See application file for complete search history.

(56) References Cited

U.S. PATENT DOCUMENTS

| 4,135,418 | A | * | 1/1979 | McCray et al. | 82/159 |
| 5,875,696 | A | * | 3/1999 | Grossmann | 82/159 |
| 6,003,415 | A | * | 12/1999 | Turner et al. | 82/159 |
| 6,701,815 | B2 | * | 3/2004 | Judas | 82/158 |
| 8,430,004 | B2 | * | 4/2013 | Reinauer | 82/159 |
| 8,448,549 | B2 | * | 5/2013 | Ueda et al. | 82/121 |
| 2003/0029287 | A1 | * | 2/2003 | Judas | 82/158 |

FOREIGN PATENT DOCUMENTS

| DE | 2736412 | 3/1978 |
| DE | 4028775 | 7/1991 |
| DE | 20319597 | 4/2004 |
| DE | 102009037167 | 2/2011 |
| DE | 102009011221 | 5/2012 |
| JP | 02218505 A * | 8/1990 ............. B23B 29/00 |

* cited by examiner

*Primary Examiner* — Will Fridie, Jr.
(74) *Attorney, Agent, or Firm* — Volpe and Koenig, P.C.

(57) ABSTRACT

A revolver disk (1) for a machine tool with, in the area of the radially extending bore holes (7) for the projection (9) of tool holders (5), a rotary axis of the revolver disk (1) extending parallel and penetrating bores (11) aligned perpendicular in reference to the face, by which a tool holder key (27) is guided. By displacing the tool holder key (27) against the force of a spring (17) the frontal end (25) is inserted into the clamping device in the projection (9) of the tool holder (5) and thus the tool is clamped with it.

7 Claims, 3 Drawing Sheets

REVOLVER DISK AND TOOL HOLDER FOR A CUTTING TOOL

CROSS-REFERENCE TO RELATED APPLICATIONS

This application claims the benefit of Swiss Patent Application No. 00928/11, filed May 31, 2011, which is incorporated herein by reference as if fully set forth.

BACKGROUND

The invention is directed to a revolver disk and a tool holder for a cutting tool.

Revolver disks are particularly used in CNC-machine tools, such as e.g., machining centers, in order to always provide a larger number of tools ready for use and thus allowing the performance of a fully-automated processing of a work piece with different tools without causing any change of tools and thus any downtime of the machine. Tool holders are fastened on the revolver disks, which in turn receive the tools, for example cutting inserts, cutters, drill bits, etc. The fastening of the tool holder usually occurs peripherally at bores extending radially at the revolver disk for the different tool systems and the fastening of the tools at the tool holders via clamping devices known from prior art. These clamping devices in tool holders of prior art can be operated from the front such that they project radially relatively far outwardly beyond the periphery of the revolver disk and thus the tool length becomes relatively large over the periphery of the revolver disk (measured radially) and/or the radial processing depth becomes respectively smaller.

SUMMARY

One objective of the present invention comprises to further develop the revolver disk and the tool holder such that an additional radial tool length can be achieved without reducing the diameter of the revolver disk and to allow for the existing revolver disks to be retrofitted with minimal expenses and their use can be continued.

This objective is attained in a revolver disk and a tool holder according to the features of the invention as described below and in the claims.

By moving the clamping device for the tool in the tool holder from radially positioned over the periphery of the disk into the revolver disk, i.e. radially under the periphery of the revolver disk, the radial length of the parts of the tool holder projecting from the periphery are considerably shortened and thus space can be gained for an increased length of the tools. The invention also allows subsequent processing of existing revolver disks, already in use, with little mechanical changes and thus with little financial expense, in order to allow the use of tool holders according to the invention which yield a greater tool length. The conventional, existing tool holders can still be used.

BRIEF DESCRIPTION OF THE DRAWINGS

The invention is explained in greater detail based on an illustrated exemplary embodiment. Shown are.

DETAILED DESCRIPTION OF THE PREFERRED EMBODIMENTS

Figure 2:
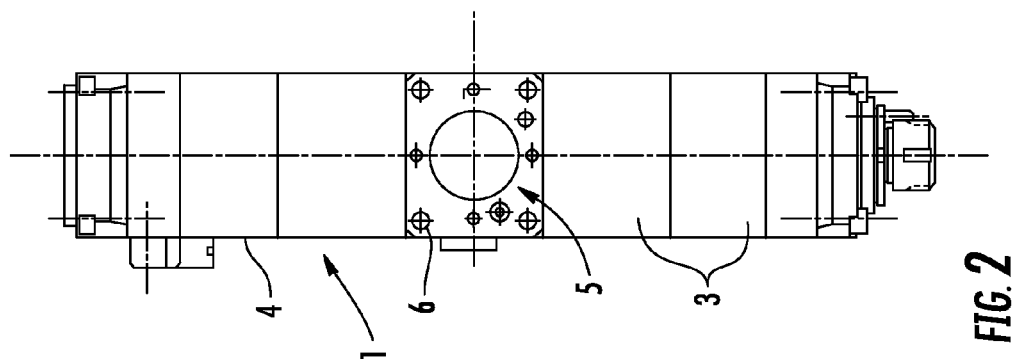
FIG. 2 is a side view of the revolver disk in FIG. 1 from the direction of the arrow P.
Figure 1:
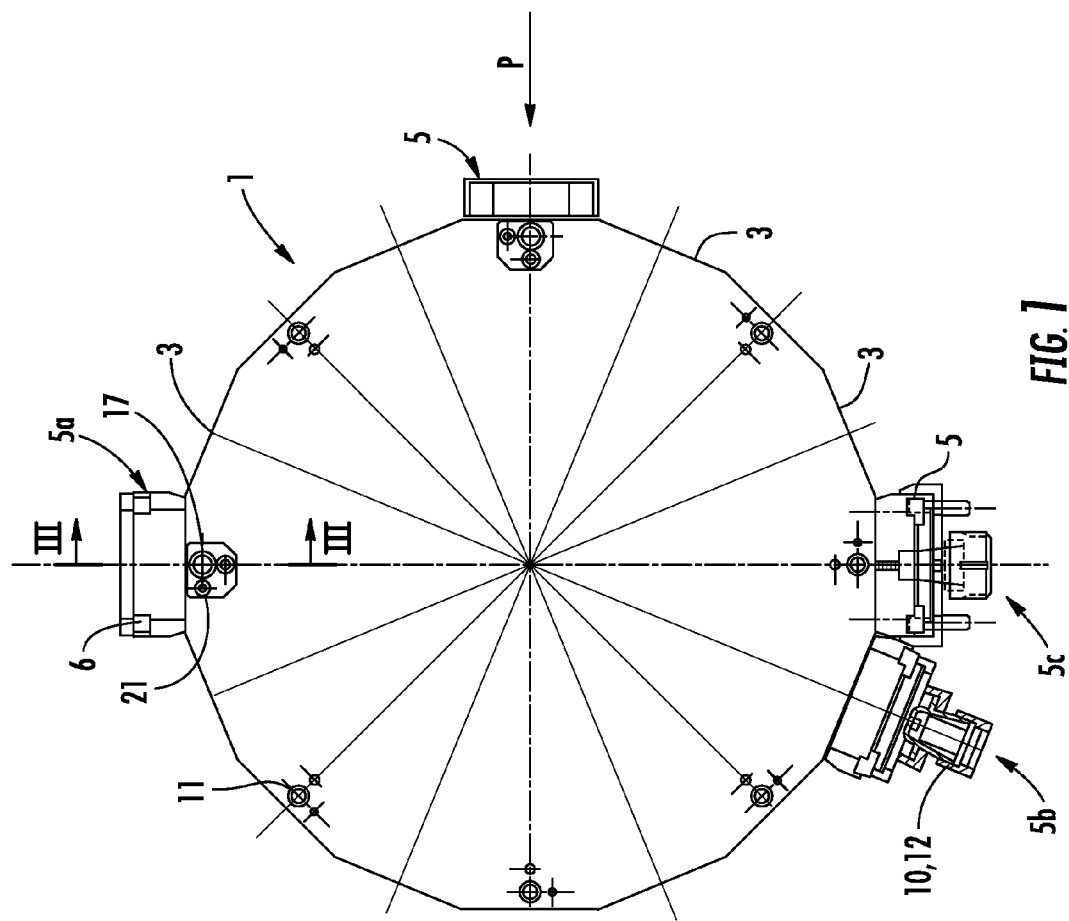
FIG. 1 is a facing view of a revolver disk with different tool holders placed on it.
Figure 3:
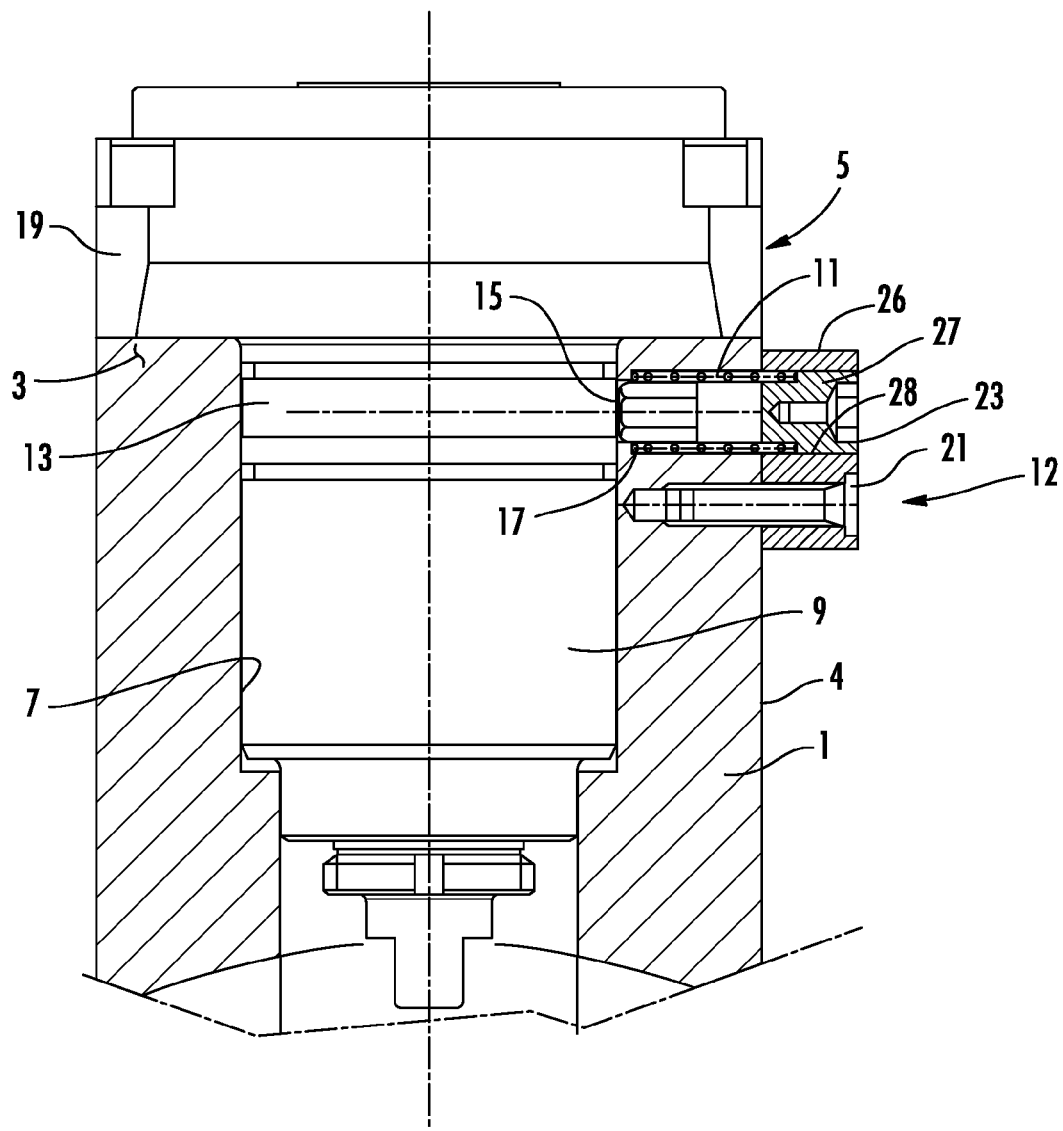
FIG. 3 is a partial cross-section through the revolver disk along the line III-III in FIG. 1.
Figure 5:
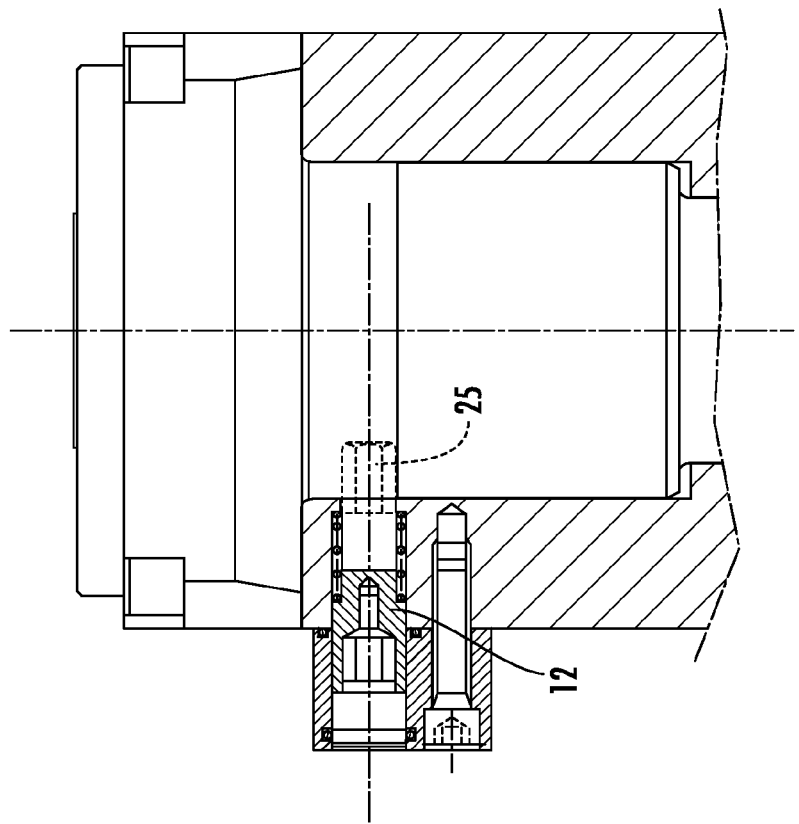
FIG. 5 is a cross-sectional view along the line III-III in FIG. 1, during clamping and loosening of the tool.

In the figures, using the reference character 1, a revolver disk is shown, for example schematically a BMT-revolver disk. In the present example, the periphery of the revolver disk 1 is embodied with 16 peripheral planar contact surfaces 3 for the tool holders 5a, 5b, and 5c. With the reference 5a, a standard tool holder is shown without any tool, however with the bore holes according to the invention and a cover plate for a facial clamping of the tool in the tool holder 5. 5b shows a standard holder with a conventional collet-tool holder, and 5c is a standard holder with a tool holder, which is fastened conventionally, although the facial fastening means (bore holes) according to the invention are present in the revolver disk 1. Respectively in the middle of each of the 16 contact areas 3, a bore hole 7 is inserted into the revolver disk 1 (cf. FIG. 3) extending radially in reference to the rotary axis of the revolver disk 1. The bore hole 7 serves to accept a standardized cylindrical projection 9 of the respective tool holder 5. The tool holders 5(a-c) are fastened as in the prior art via bolts 6 in threaded bore holes on the contact surfaces 3 of the revolver disk 1, after the projection 9 has been inserted into the bore hole 7. In tool holders of the prior art (marked 5b in FIG. 1), the fastening/clamping of a tool (tool not shown) occurs in the tool holder 5 via a collet 10, e.g., according to DIN 6499B, using clamping elements such as a clamping nut 12, which clamping elements project from the surface of the tool holder 5, located radially outside, by several centimeters and thus shorten the active tool length by the amount of the axial length of the collet 10.

Figure 4:
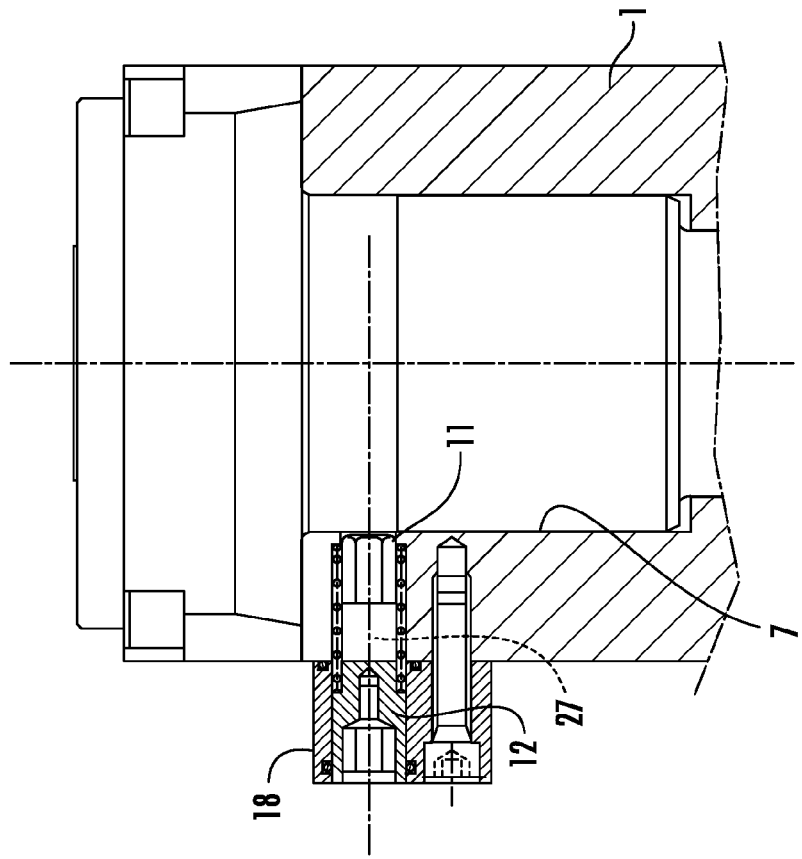
FIG. 4 is a cross-sectional view along the line III-III in FIG. 1, before and after the clamping of the tool and/or the condition during processing.

In the revolver disk 1 embodied according to the invention the tool holders 5 are fastened in the same manner via bolts 6 as in prior art. The fastening of the tools in the tool holder 5 occurs by a collet inside the tool holders 5a and 5c, arranged in the lower part of the tool holder 5a, 5c and located inside the bore hole 7 and thus radially below the facial areas 5 and thus inside the revolver disk 1, comprising a tool holder key 27, with e.g., a polygon being embodied at its frontal end. The tool holder key 27 is held axially displaceable in a guiding plate 26 in a guiding bore hole 28 embodied there. At the one side, a spring 17 is located at the head of the tool holder key 27 and is supported at the other side at a step in the guiding bore hole 28. A stopper element 18 (FIG. 4) additionally hinders the tool holder key 27 from exiting the guiding bore 28. The spring 17 keeps the tool holder key 27 from engaging any tool inserted into the bore hole 7 at the tool holder 5. The tool holder key 27 penetrates the revolver disk 1 in a penetrating bore 11, when it is pushed axially forward with a rotary tool, e.g., an Allen wrench (not shown) against the force of the spring 17.

When, therefore, the tool holder key 27 is pushed forward against the force of the spring 17, the frontal end 25, which may be embodied as a polygon, e.g., a hexagon, first pushes the periphery of the projection 9 towards the tool holder 5a. Then it penetrates the casing of the projection 9 and subsequently engages an eccentric at the clamping device for the tool. The embodiment of the clamping device is not show for better clarity. It may be embodied similar to clamping devices or drill tool holders of prior art.

By a rotation of the tool holder key 27, using the Allen wrench limiting the torque, the clamping device located inside the projection 9 and not shown in the figures can clamp a tool inserted into the tool holder 5. After the conclusion of a rotary motion of for example 90° for tightening a tool, the tool holder key 27 and/or its frontal end 25 is radially pulled out of the clamping device by the force of the spring 17 and pulled out of the bore hole in the jacket of the projection 9 and thus releases the engagement with the tool holder 5a such that, if the tool is inserted rotational in the tool holder 5a, it can freely spin.

By the arrangement of the clamping device with the clamping elements arranged therein in the area of the projection 9 at the tool holder 5a, which engages the bore 7 under the periphery of the revolver disk 1, the radial length of the tool holder 5a is reduced and thus the useful length of the tool increases accordingly. For this purpose, only (per work station) three bore holes are required at the revolver disk 1, two in the form of threaded bores for fastening the guiding plate 26 with the bolts 21 at the face of the revolver disk 1 and one, the larger one, for the passage of the tool holder key 27 and the engaging element embodied at its frontal end 25.

If, since already provided, a tool holder 5b of prior art shall be placed upon the revolver disk 1 embodied according to the invention this is still possible. Here, it is not required to remove the guiding plate 26 with the operating bolt 27.

Already given revolver disks 1 can be easily retrofitted, namely by a subsequent drilling of three holes. Revolver disks 1 retrofitted here or revolver disks 1 provided by the manufacturer with the bores can therefore serve to fasten the tool holder 5a according to the invention or the existing tool holders 5b of prior art.

LEGEND OF THE REFERENCE CHARACTERS

1 revolver disk
3 support area
4 face area
5 tool holder
6 bolts
7 bore hole
9 projection/shaft
10 collet
11 penetrating bore holes
12 clamping elements/clamping nut
13 injection
15 frontal end
17 spring
19 tool accept area
21 fastening bolt
23 cover plate
25 frontal end
26 guiding plate
27 tool holder key
28 guiding bore

The invention claimed is:

1. A revolver disk (1) for a machine tool adapted to receive a multitude of tool holders (5) for cutting tools, comprising support areas (3) embodied at a periphery of the revolver disk (1) for the tool holders (5), extending radial in reference to a rotary axis of the revolver disk (1), bore holes (7) each inserted into the support areas (3) for receiving projections (9) of the tool holders (5), and threaded bores in the support areas (3) to fasten the tool holders (5) with bolts (6) on the support areas (3), penetrating bores (11) are located in a side face area (4) of the revolver disk (1), spaced apart from the support areas (3), in which the radial bore holes (7) are embodied to receive the projections (9) of the tool holders (5), the penetrating bores (11) are adapted for insertion of tool holder keys (27) into an inside of the projections (9) of the tool holders (5) in order to clamp any clamping element located there to clamp tools to the tool holders (5).

2. The revolver disk according to claim 1, wherein at least one threaded bore is also provided for fastening a guiding plate (26) in the side face area (4), in addition to the penetrating bores (11).

3. The revolver disk according to claim 2, wherein the guiding plate (26) comprises a guiding bore (28) for the axial guidance of a tool holder key (27).

4. The revolver disk according to claim 3, wherein a spring (17) is inserted in the guiding bore (29), which keeps the tool holder key (27) in an unstressed state from engagement with the tool holder (5).

5. The combination of the revolver disk according to claim 1 and a tool holder (5a) fastened to a revolver disk (1), wherein the penetrating bores (11) are embodied at a face in the radial bore holes (7) in the periphery of the revolver disk (1), and a clamping device is arranged in the projection (9) of the tool holder (5a) to clamp and hold a cutting tool in the tool holder (5).

6. The combination according to claim 5, wherein a hole is located in a casing of the projection (9) in order to allow passage of the tool holder key (27) into an interior of the projection (9) up to the clamping device arranged there.

7. The combination according to claim 6, wherein the hole in the projection (9) is aligned with the allocated penetrating hole (11) arranged in the revolver disk (1), when the tool holder (5) is inserted in the revolver disk (1).

\* \* \* \* \*